United States Patent Office 3,149,160
Patented Sept. 15, 1964

3,149,160
N-(2-PROPYNYL) o-BROMOANILINE
Chester E. Pawloski, Bay City, Mich., assignor to The Dow Chemical Company, Midland, Mich., a corporation of Delaware
No Drawing. Filed Mar. 23, 1961, Ser. No. 97,743
1 Claim. (Cl. 260—577)

This invention is directed to N-(2-propynyl) o-bromoaniline corresponding to the formula

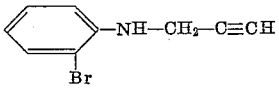

This compound is a liquid material somewhat soluble in many common organic solvents and of very low solubility in water. It is useful as a parasiticide and herbicide for the control of the growth and the killing of a number of plant, bacterial and fungal organisms such as round worms, Aerobacter aerogenes, Aspergillus terreus, German millet and pigweed.

The new N-(2-propynyl) o-bromoaniline is prepared by reacting propargyl bromide or propargyl chloride with o-bromoaniline. The reaction is carried out in a liquid reaction medium such as diethyl ether, acetone, benzene or heptane and in the presence of a halide acceptor which may be an excess of the amine reagent and conveniently a basic material such as an alkali metal carbonate. The reaction takes place smoothly at the temperature range of from about 34°–100° C. with the production of the desired product and halide of reaction. This halide appears in the reaction mixture as the salt of the amine reagent or of the metal in the employed base. Good results are obtained when reacting about one molecular proportion of o-bromoaniline with about one molecular proportion of propargyl halide in the presence of about one molecular proportion of the halide acceptor. Upon completion of the reaction, the desired product may be separated and purified by conventional procedures.

In carrying out the reaction, the propargyl halide, o-bromoaniline and halide acceptor are dispersed in the reaction medium and the resulting mixture maintained for a period of time with stirring at a temperature of from about 34° to 100° C. to insure completion of the reaction. The reaction mixture conveniently is then washed with water and the washed mixture fractionally distilled under reduced pressure to obtain the desired product as a liquid material.

In a representative operation, o-bromoaniline (100 grams; 0.58 mole), 138 grams (1.16 moles) of propargyl bromide and 160 grams (1.16 moles) of potassium carbonate were dispersed in 500 milliliters of acetone and the resulting mixture heated with stirring at the boiling temperature and under reflux for 8 hours. The reaction mixture was then washed with water and thereafter fractionally distilled under reduced pressure to obtain a N-(2-propynyl) o-bromoaniline product boiling at 97° C. at 0.5 millimeters pressure and having a refractive index $n/D$ of 1.5956 at 25° C.

The novel product of the present invention is useful as a herbicide and parasiticide for the control of the growth and killing of a number of plant and parasite species. For such uses, the product is dispersed on an inert finely divided solid and employed as a dust. Such mixtures also may be dispersed in water with or without the aid of a surface active agent, and the resulting aqueous suspensions employed as sprays. In other procedures, the product is employed as an active constituent in solvent solutions, oil-in-water or water-in-oil emulsions, or aqueous dispersions. In representative operations, N-(2-propynyl) o-bromoaniline gives 100 percent controls of the growth of the germinant seeds and emerging seedlings of German millet at a dosage of 50 pounds per acre. In other operations, N-(2-propynyl) o-bromoaniline gives 100 percent kills or round worms at a concentration of 300 parts per million by weight.

I claim:
N-(2-propynyl) o-bromoaniline.

References Cited in the file of this patent
UNITED STATES PATENTS
2,342,493    Reppe et al. _____ Feb. 22, 1944

OTHER REFERENCES
Wolf: Justus Liebig's Annalen der Chemie, 1952 Band 576, page 36.
Wolf: "Justus Liebig's Annalen der Chemie," vol. 592, pp. 222-44 (1955).